United States Patent
Hawes et al.

(10) Patent No.: US 12,013,524 B2
(45) Date of Patent: *Jun. 18, 2024

(54) METHOD AND APPARATUS FOR IMAGING A SAMPLE USING A MICROSCOPE SCANNER

(71) Applicant: Ventana Medical Systems, Inc., Tucson, AZ (US)

(72) Inventors: William Roland Hawes, Hertfordshire (GB); Martin Philip Gouch, Hertfordshire (GB)

(73) Assignee: Ventana Medic Systems, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,988

(22) Filed: Dec. 5, 2020

(65) Prior Publication Data

US 2021/0088769 A1    Mar. 25, 2021

Related U.S. Application Data

(63) Continuation of application No. 16/385,945, filed on Apr. 16, 2019, now Pat. No. 10,895,731, which is a
(Continued)

(30) Foreign Application Priority Data

May 23, 2014    (GB) ..................... 1409202

(51) Int. Cl.
*G02B 21/36* (2006.01)
*G02B 21/26* (2006.01)

(52) U.S. Cl.
CPC .......... *G02B 21/365* (2013.01); *G02B 21/26* (2013.01); *G02B 21/367* (2013.01)

(58) Field of Classification Search
CPC ..... G02B 21/365; G02B 21/26; G02B 21/367
(Continued)

(56) References Cited

U.S. PATENT DOCUMENTS 4,170,737 A    10/1979    Bobrov et al.
5,068,739 A    11/1991    Filo
(Continued)

FOREIGN PATENT DOCUMENTS

DE    102011075369 A1    11/2012
EP        2098900 A1     9/2009
(Continued)

OTHER PUBLICATIONS

International Preliminary Report on Patentability dated Dec. 8, 2016 in corresponding PCT/GB2015/051494 filed May 21, 2015, pp. 1-17.
(Continued)

*Primary Examiner* — Rebecca A Volentine
(74) *Attorney, Agent, or Firm* — Charney IP Law LLC; Thomas M. Finetti

(57) ABSTRACT

A microscope scanning apparatus is provided comprising a detector array for obtaining an image from a sample and a sample holder adapted to hold the sample when in use and to move relative to the detector array along a scan path. A controller is further provided to monitor the position of the sample holder relative to the detector array and to trigger image capture by the detector array in accordance with said monitored position.

20 Claims, 6 Drawing Sheets

Related U.S. Application Data continuation of application No. 15/359,610, filed on Nov. 22, 2016, now Pat. No. 10,317,666, which is a continuation of application No. PCT/GB2015/051496, filed on May 21, 2015.

(58) Field of Classification Search
USPC .......................................................... 348/79
See application file for complete search history.

(56) References Cited

U.S. PATENT DOCUMENTS

| | | | |
|---|---|---|---|
| 5,912,699 A | 6/1999 | Hayenga et al. | |
| 6,339,217 B1 | 1/2002 | Kley | |
| 8,064,622 B1 | 11/2011 | Opris | |
| 8,164,622 B2 | 4/2012 | Crandall | |
| 2002/0089740 A1* | 7/2002 | Wetzel | H04N 7/188 359/368 |
| 2002/0090127 A1* | 7/2002 | Wetzel | H04N 7/188 382/282 |
| 2003/0127609 A1 | 7/2003 | El-Hage et al. | |
| 2004/0252875 A1 | 12/2004 | Crandall et al. | |
| 2005/0089208 A1* | 4/2005 | Dong | G06T 3/4038 382/133 |
| 2005/0174583 A1 | 8/2005 | Chalmers et al. | |
| 2005/0174584 A1 | 8/2005 | Chalmers et al. | |
| 2006/0283240 A1 | 12/2006 | Struckmeier et al. | |
| 2006/0285635 A1 | 12/2006 | Boppart et al. | |
| 2007/0002434 A1 | 1/2007 | Juskaitis et al. | |
| 2007/0147673 A1 | 6/2007 | Crandall | |
| 2008/0285795 A1* | 11/2008 | Maddison | G02B 21/367 382/100 |
| 2009/0231689 A1* | 9/2009 | Pittsyn | G01B 9/04 359/363 |
| 2009/0304288 A1 | 12/2009 | Rohaly | |
| 2010/0187091 A1 | 7/2010 | Pierce et al. | |
| 2010/0188743 A1 | 7/2010 | Inoue | |
| 2011/0108707 A1 | 5/2011 | Cui et al. | |
| 2011/0141103 A1 | 6/2011 | Cohen et al. | |
| 2011/0221881 A1* | 9/2011 | Shirota | G02B 21/26 348/79 |
| 2011/0261164 A1* | 10/2011 | Olesen | G06T 7/0012 382/128 |
| 2012/0130258 A1 | 5/2012 | Taylor et al. | |
| 2012/0147224 A1 | 6/2012 | Takayama | |
| 2013/0079599 A1* | 3/2013 | Holmes | A61B 8/483 600/300 |
| 2013/0162802 A1* | 6/2013 | Soenksen | H04N 5/2256 348/79 |
| 2013/0286179 A1 | 10/2013 | Markle et al. | |
| 2014/0125776 A1* | 5/2014 | Damaskinos | G01N 21/47 348/50 |
| 2014/0176694 A1* | 6/2014 | Mermelstein | G02B 21/16 348/79 |
| 2014/0193061 A1* | 7/2014 | Miller | G06T 7/32 382/133 |
| 2015/0103181 A1 | 4/2015 | Mou | |
| 2015/0317782 A1 | 11/2015 | Dent et al. | |
| 2016/0077322 A1* | 3/2016 | Iwase | G02B 21/244 348/80 |

FOREIGN PATENT DOCUMENTS

| | | |
|---|---|---|
| JP | 2003344781 A | 12/2003 |
| JP | 2011028291 A | 2/2011 |
| JP | 2014064946 A | 4/2014 |
| WO | 2001084209 B1 | 1/2003 |
| WO | 2014040184 A1 | 3/2014 |

OTHER PUBLICATIONS

International Search Report and Written Opinion dated Jul. 24, 2015 in corresponding PCT/GB2015/051494 filed May 21, 2015, pp. 1-10.

Cheng et al, Ultrasmall line scan nonlinear optical microscope using 1D dischroic MEMS scanner and SIOB assembly (Year: 2019).

Wu et al, A compact tapping mode AFM with sliding mode controller for precision image scanning (Year: 2011).

Jpn. pat. apln. No. 2016-569383, Translation of Official Action, dated Apr. 23, 2019.

* cited by examiner

METHOD AND APPARATUS FOR IMAGING A SAMPLE USING A MICROSCOPE SCANNER

CROSS-REFERENCE TO RELATED APPLICATIONS

This patent application is a continuation of U.S. patent application Ser. No. 16/385,945 filed on Apr. 16, 2019, which application is a continuation of U.S. patent application Ser. No. 15/359,610 filed on Nov. 22, 2016, which application is a continuation of International Patent Application No. PCT/GB2015/051496, filed May 21, 2015, which application claims priority to and the benefit of GB Application No. 1409202.7, filed May 23, 2014. Each of the above patent applications are incorporated herein by reference as if set forth in their entireties.

TECHNICAL FIELD

The present disclosure relates to a method and apparatus for imaging a sample using a microscope scanner.

BACKGROUND

Microscope scanners available today typically digitise images of microscope samples, such as slides, by obtaining images of multiple sections on the surface of a sample and combining these together into an aggregate image to create an overall digitised image of the sample.

In order to avoid any spatial distortions in the image it is advantageous to ensure that each image is obtained at regularly spaced intervals on the sample. Current microscope scanners attempt to achieve this by moving the sample at a constant velocity relative to a detector and then acquiring multiple images of the sample at a given frequency using the detector. The movement of the sample may be synchronised with the capture rate of the detector so as to enable image capture at the maximum possible rate whilst ensuring that the surface of the sample is fully imaged. Despite this it has been found that spatial distortions can still occur in the digitised image.

SUMMARY

In accordance with a first aspect of the present disclosure there is provided a microscope scanning apparatus comprising: a detector array for obtaining an image from a sample; a sample holder adapted to hold the sample when in use, said sample holder being configured to move relative to the detector array along a scan path; and a controller configured to monitor the position of the sample holder relative to the detector array and to trigger image capture by the detector array in accordance with said monitored position.

The present disclosure provides, among other things, an improved method for imaging a microscope sample by addressing a number of shortcomings in the prior art. Firstly, unlike the prior art, image capture is triggered by a measured position rather than an assumed position. This ensures that image capture occurs at desired locations on the sample and can prevent spatial distortions from being produced in the image of the entire sample. It also reduces the impact of positional errors which could result, for example, from external vibrations on the system that disturb the movement between the sample holder and the detector array. Prior art methods assume that the motion between the sample and the detector is at a constant velocity during the scan and thus that any images acquired at equal intervals in time necessarily correspond to equal distances on the sample. This assumption cannot always be relied upon as it is generally difficult, or at the very least expensive, to produce microscope scanners with the required sensitivity so as to provide a truly constant velocity. The velocity of the sample instead typically fluctuates about a mean value during the image scan. These fluctuations mean that certain images of the sample occur at the wrong locations and thus spatial distortions occur when the images obtained from the scan are mapped onto an aggregate image.

There is another inherent limitation in the prior art method; namely that the efficiency is compromised by the need to wait for the sample to be accelerated to a constant velocity before imaging can occur and then subsequently decelerated thereafter. There is hence an inherent period of 'dead-time' during which image capture cannot occur. This increases the overall duration of the scan and can be particularly limiting when multiple image swathes are sought from multiple samples.

Scanners today typically do not have the ability to trigger the image capture from a measured position and instead require a constant time interval signal to trigger image capture using a detector array. The present disclosure addresses the above limitations by providing a microscope scanner for which image capture is tied directly to measured positions on the sample. These positions may be equally spaced on the surface of the sample, relative to the optic axis of the detector. This increases the accuracy of the system as it is no longer reliant upon its ability to maintain a constant velocity between the sample holder and the detector array. The efficiency of the system is also improved as image capture can now occur during the 'ramp up' and 'ramp down' accelerating stages of the sample motion.

The sample holder is configured to move relative to the detector array along a scan path during an imaging scan. This could mean that the sample holder is moved along a scan path whilst the detector array is held stationary, or that the detector array is moved along a scan path whilst the sample holder is held stationary. In principle, each could be in motion also. The exact method by which this relative movement is obtained is not important so long as different areas of the sample are consequently within the field of view of the detector during the imaging scan.

The microscope system can further comprise a drive assembly configured to move the sample holder relative to the detector array. This drive assembly can be controlled by the controller and may comprise a motor so as to drive movement between the detector array and the sample holder. Examples of suitable motors are stepper motors and servomotors. The drive assembly advantageously further comprises a track configured to enable the sample holder, or the detector array, to move relative to the other along a scan path. This track may be laterally offset in a direction perpendicular to both the optical axis of the detector and the scan path so as to enable adjacent scans or 'swathes' to be obtained of the sample. In addition to this, the focal height may also be modulated during the scan by other means, such as stack focus techniques, so that the sample is always in focus during the imaging scan. This focus control could, for example be performed by the controller and a dedicated drive system.

The system may further comprise a position sensor for monitoring the relative position between the detector array and the sample holder along the scan path. This position sensor may form part of the drive assembly and could, for example, be a linear encoder coupled to the track or a rotary encoder coupled to the motor. The output from the position sensor can be fed to the controller which may trigger image capture by the detector array based on this output. The sensor could also be used as the feedback sensor for a servo control system, as is the case in a servomotor.

In order to obtain a complete and continuous image of the sample each image captured by the detector array can be equally distally spaced on the surface of the sample. This spacing can be substantially equal to the field of view of the detector array. This ensures that there is no overlap or gaps between adjacent images along a scan path and that the images are contiguous.

The sample holder may be moved relative to the detector array according to a target velocity profile that may be stored on a memory accessed by the controller. The target velocity profile can be thought of as a predetermined velocity-time trajectory for the sample motion and includes any accelerating, constant velocity or decelerating phases. The target velocity profile can be chosen so as to achieve image scans of the shortest possible duration for a given system.

A further benefit is realized by configuring the controller to modulate the exposure of the detector array in accordance with the velocity of the sample holder relative to the detector array. The instantaneous velocity during a scan can be found by the controller either through reference to the velocity profile or by calculating the change in monitored position with time. As the velocity of the sample holder (or detector array) increases, the exposure time of the detector may be decreased so as to prevent image blur. In order to ensure equal overall light exposure on the sensor, the intensity of light incident on the detector may be adjusted accordingly. An additional benefit is therefore provided where the system further comprises a light source for illuminating the sample and wherein said controller is further adapted to modulate the intensity of the light output by the light source in accordance with the velocity of the sample holder relative to the detector array.

The maximum capture rate of the system may be compromised to allow for the minimum time interval between successive image capture triggers during a scan. This minimum time interval may not be known and may be dependent on the impact of external vibrations on the system. Image sensors have a minimum time period between lines or frames which is determined by the maximum frame rate (or "line rate"). This is either limited by the time it takes the detector to read out the data from the previous exposure or the exposure time required. If images are triggered at a rate higher than this, the trigger may be ignored leading to a missing frame or line in the image. The controller can be therefore further provided with a filter module such that when in use, the trigger rate does not exceed the maximum frame rate of the detector array. In the event that a missing line or frame is detected (i.e. a missing individual image in the 'aggregate image'), this may be corrected for post image acquisition through an interpolation technique, for example using data received from neighbouring images. This could occur, for example, where the frame rate is not high enough to match the sample holder movement so as to acquire images at the prescribed positions. Therefore, the controller can be further configured to interpolate missing data in the aggregate image. In the event that movement between the sample holder and the detector array is based on a velocity profile, the velocity profile may be chosen such that the velocity should not exceed a threshold that would cause images to be captured at a frame rate above a notional minimum time interval for the system. In picking the notional minimum time interval an allowance may be made for the maximum frame rate of the detector and the impact of possible accelerating vibrations.

The target may take a number of forms and can comprise, for example, a biological tissue sample. For example, the target could be a stained tissue extract that has been sliced and mounted on a flat glass slides.

The controller can be an electronic controller for operating the apparatus in response to one or more manual user controls, or instructions embodied in circuitry or software. The controller is in communication with the drive assembly, the detector array, and the light source and may operate any of said devices. As well as controlling the apparatus, the controller may be suitable for performing an image processing function. Typically the controller comprises one or more processors and memory. The one or more processors may reside on a PC or other computer device. Furthermore, the controller may be integral with the device itself, or reside on an external computing system to which the remainder of the apparatus is connected, or both. This computing system may comprise a display and a variety of user input devices and be used to select scan areas of the sample, as well as to view any images or aggregate images that are produced.

In order to form an overall image of the sample the controller can be further adapted to combine images captured by the detector array at the plurality of locations into an aggregate image. Each image obtained by the detector array can be of a different but bordering area of the sample. Thus the controller may combine each contiguous image captured by the detector array during an imaging scan together (e.g., accounting for any overlap or missing lines between images) so as to form a larger aggregate image of the sample.

According to a second aspect of the disclosure there is provided a method for imaging a sample using a microscope scanner, the microscope scanner comprising: a detector array for obtaining an image from the sample; a sample holder adapted to hold the sample when in use, said sample holder being configured to move relative to the detector array along a scan path; and a controller configured to monitor the position of the sample holder relative to the detector array, the method comprising: monitoring the position of the sample holder along the scan path and triggering image capture by the detector array in accordance with said monitored position.

The features of the second aspect of the disclosure share the same advantages as those discussed with reference to the apparatus in the first aspect of the disclosure.

BRIEF DESCRIPTION OF THE DRAWINGS

Examples of methods and apparatuses according to the present disclosure are now described with reference to the accompanying drawings, in which.

DETAILED DESCRIPTION

Figure 1:
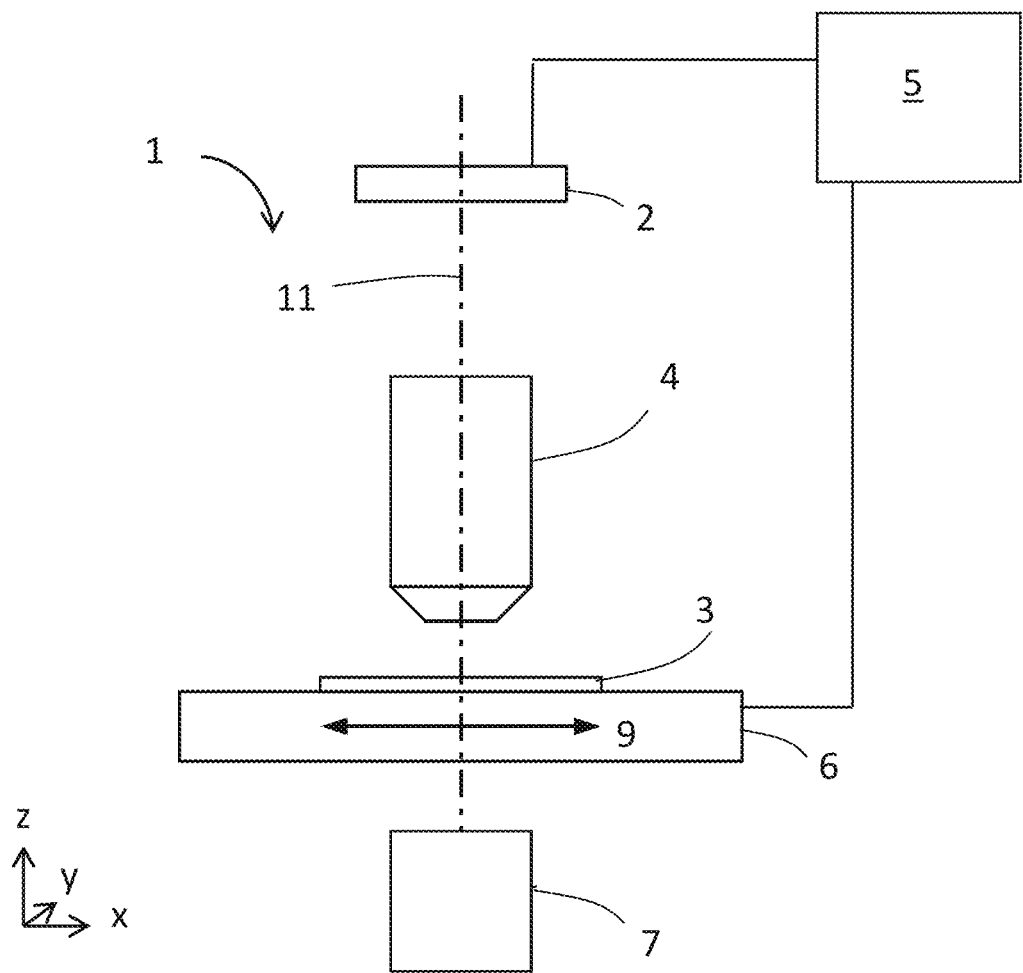
FIG. 1 is a schematic representation of a first example apparatus.

An example of an image scanning apparatus 1 is shown in FIG. 1. This comprises a sample holder 6, such as a stage, adapted to hold a sample 3 contained on a microscope slide. The sample holder 6 is aligned with the imaging optics 4 and a detector array 2 which may together form an integral unit or camera. A light source 7, comprising one or more LEDs, is further provided so that light from the light source 7 illuminates the sample 3 and arrives at the detector array 2 through the imaging optics 4.

Figure 5:
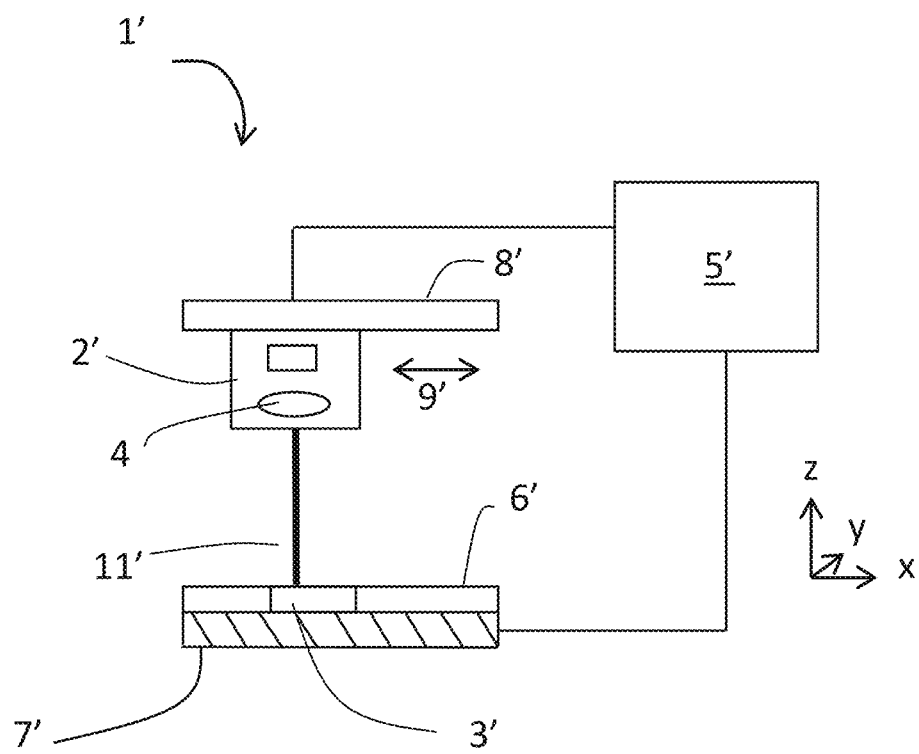
FIG. 5 is a schematic representation of a second example apparatus.

Coordinate axes are also provided in FIGS. 1 and 5 for reference. The ordinate z-axis is aligned with the optical axis 11 of the microscope scanner 1, whereas the abscissa x-axis represents the scan direction (parallel to the horizontal arrow in FIG. 1). The surface of the sample 3 is aligned in the xy plane.

The sample holder 6 is configured to move relative to the detector array 2 during an imaging scan as shown by the horizontal arrows 9 along a track (not shown) in the x-direction. Motion of the sample holder 6 is driven along the track by a servomotor. In the present example the sample holder 6 is moved whilst the remainder of the microscope scanner 1, including the detector array 2, remains stationary, however the detector array 2 (together with the imaging optics 4) may be moved instead as only relative movement between this and the sample is required.

The track and sample holder 6 are coupled to a linear incremental encoder configured to monitor the position of the sample holder 6. The encoder and the detector array 2 are connected to a controller 5 as shown. When in use, the sample holder 6 is moved along a scan path in response to a signal issued to the motor by the controller, whilst positional information concerning the sample holder is fed back to the controller 5 by the encoder. The controller 5 then issues trigger signals to the detector array 2 causing it to capture an image when the sample holder 6 has moved by a distance d along the scan path. This distance is substantially equal to the field of view of the detector array 2 in that direction so as to ensure there is no overlap or gap between adjacent images of the sample 3.

The image acquired by the movement of the detector across the image scan path forms a swathe. The method finds particular use when implemented using a line scan detector or a 'line scanner'. Line scan detectors typically comprise a photodetector array in the form of a narrow strip or line of pixels. Alternatively an area scanner, which is essentially a two dimensional line scanner, could be used. The array detector is typically configured to be incrementally moved between locations across the surface of the target, parallel to the narrow direction of the array (in the event that a line scanner is used), so as to acquire additional scan lines for each location. Once a complete swathe has been obtained the sample holder may be returned to its initial position and laterally offset (in the y-direction) so as to obtain additional swathes such that the target 3 is fully imaged.

Figure 2:
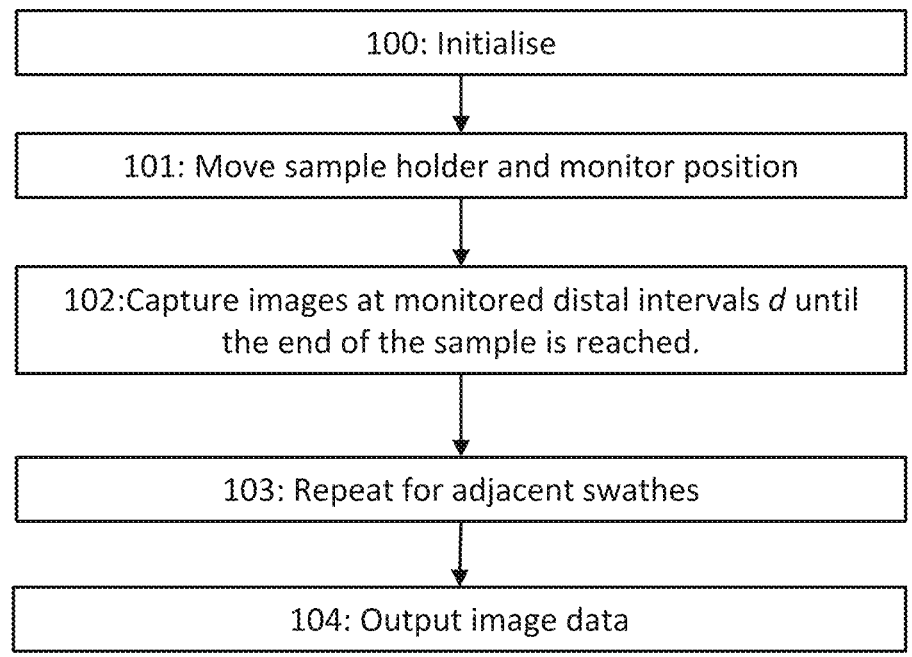
FIG. 2 is a flow diagram of a first example method.

The operation of the image scanning apparatus 1 in performing a first example method will now be described with reference to the flow diagram of FIG. 2. The method begins at step 100 where any set-up and initialisation procedures are performed including positioning the sample 3 under the imaging optics 4 so that the scan area of the sample 3, which is selected by a user, is just outside the field of view of the detector. The scan starts as the scan area is moved into the field of view of the detector.

At step 101 the controller issues a signal to the motor assembly causing it to move the sample holder 6 in the x-direction along a track. The position of the sample holder 6 along the scan path is monitored by the linear incremental encoder and fed back to the controller 5. When the controller 5 has determined that the sample holder 6 has moved by a threshold distance d it issues a trigger signal causing the detector array 2 to capture an image of the sample 3.

The threshold distance d is approximately equal to the field of view of the detector, which depends on the detector used and the resolution or magnification selected by a user. This is typically between 0.25 micrometres and 0.2 micrometres for line scan detectors. For example, a line scan camera with an optical magnification of 40× would typically use a 10 micrometre pixel size sensor to produce a pixel size of 0.25 micrometres at the sample. The scanning system would then capture an image line at every 0.25 micrometres on the sample. In the event that an area scanner is used instead, the field of view will typically be 2 millimetres, but more generally between 1 and 5 millimetres.

The sample holder 6 is continuously moved along the scan path and the process is repeated at step 103 with additional images of the sample 3 being obtained whilst the stage is in motion. The sample holder 6 first undergoes an accelerating phase and is then moved at a substantially constant velocity. This velocity is predetermined such that image capture can occur at a frequency that is just below the maximum frequency the system is capable of. Some leeway is hence allowed in case the actual movement is faster than expected, so that the detector array 2 can react in time and capture an image at the appropriate position. The sample holder 6 is subsequently decelerated until a complete image swathe of the sample has been formed.

The sample holder 6 is then returned to the initialisation position and laterally offset in y-direction by a distance equal to the field of view of the detector array 2 in the y-direction. This is appropriate in the event that a rectangular scan area (larger than the image swathe) is selected, however non-rectangular scan areas may be chosen also, in which case an appropriate movement will be made. The process of steps 101 and 102 is then repeated at step 103 for yet un-imaged areas of the sample until the entire desired area of the sample is imaged. At step 104 each image or "image tile" obtained at the plurality of target positions during the imaging scan is combined together so as to form an aggregate image of the sample. This aggregated image of the sample may then be analysed by a system user or technician.

Figure 3:
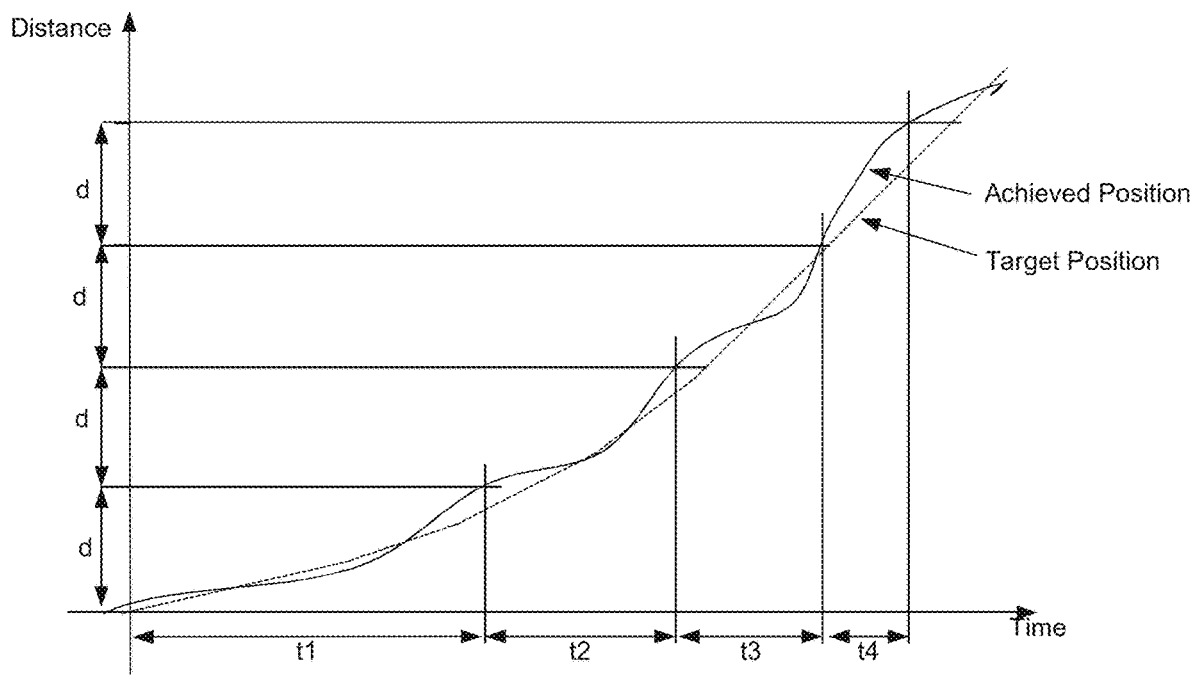
FIG. 3 is a first example of a velocity profile obtained in accordance with a second example of the disclosure.
Figure 4:
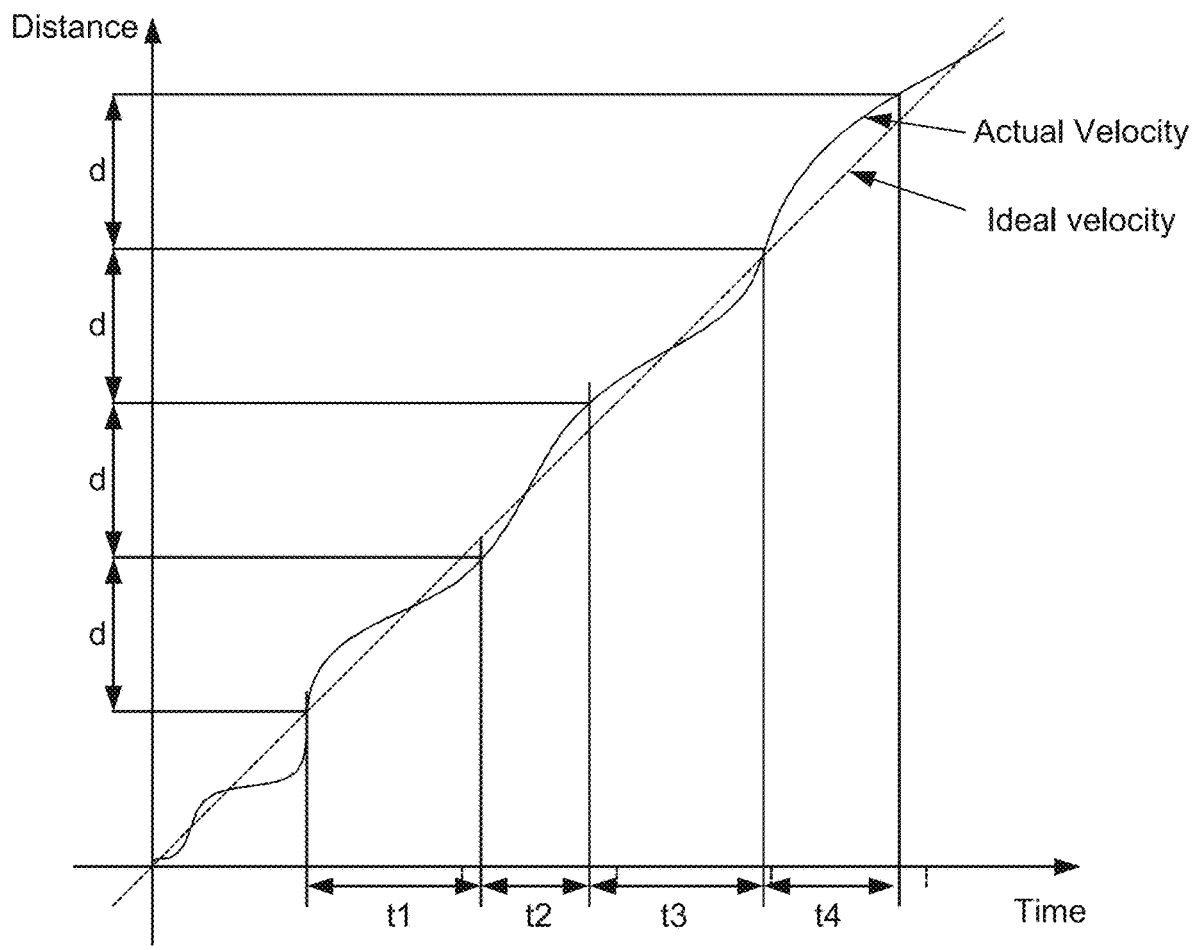
FIG. 4 is a second example of a velocity profile obtained in accordance with the second example of the disclosure.

FIGS. 3 and 4 illustrate first and second examples of a velocity profile that may be achieved according to a second example method of the disclosure. A velocity profile shows the displacement of the sample 3 (or sample holder 6) with time along a scan path relative to the detector array 2. The second example method substantially matches the first example however a servomotor is used to drive the relative movement instead of a stepper motor. Servomotors allow for precise control of velocity and acceleration and comprise a motor coupled to a sensor for position of velocity which is fed back via a closed loop to the motor. Thus a sensor may monitor either the position or velocity of the sample holder 6 using an encoder and continuously feed this information back to the motor (potentially via the controller) in order to adjust the power supplied by the motor so as to match a target velocity profile. This target velocity profile (indicated by the dotted line) may be stored on a memory that is accessed by the servomotor during the scan. The actual achieved position of the sample 3 is shown by the continuous line. The difference between these two lines shows the error in the servo system.

Unlike the prior art methods image capture occurs during the accelerating and decelerating phases of the sample motion, as well as during the constant velocity phase. FIG. 3 illustrates an accelerating phase, whereas FIG. 4 illustrates a constant velocity phase. Images are captured at times t1, t2, t3 and t4 which each correspond to equal distal intervals d on the target. Although the distances between each image are approximately equal, the times t1 to t4 generally are not (unlike the prior art) as shown. It is further shown that in practice due to the limitations of the slide scanner 1 it can be difficult to exactly match the target profile. The actual achieved position or velocity profile instead oscillates about this target. This however does not create a problem as image capture is linked to distance rather than time and so the images are equally spaced.

A second example of a microscope scanner 1' according to the disclosure is illustrated in FIG. 5. The features of this example broadly match those of the first example apparatus however the detector is moved instead of the sample holder during the image scan. This motion is also driven by a servomotor (not shown). The apparatus 1' comprises a scan head 2', such as a line scan detector, comprising a photodetector array and imaging optics 4'. A sample holder or platen 6' is provided upon which a target to be scanned 3' is positioned. The target 3', which is positioned within the sample holder 6, is typically a biological tissue sample. The scan head 2' is attached to a track 8' enabling it to be moved with respect to the remainder of the apparatus 1' along the x-axis, as indicated by the arrows 9'. Motion of the scan head 2' is driven by a stepper motor configured to operate according to a target velocity profile stored on a memory.

The track 8' and the scan head 2' are coupled to a linear incremental encoder configured to monitor the position of the scan head 2' relative to the sample holder 6 along a scan path. The track 8' also allows the scan head to be offset in the y-direction for imaging adjacent swathes. The image scanning apparatus 1' is controlled using a controller 5' which may comprise programmable logic, a dedicated processor or a computer system. In this example a light source 7' is situated beneath the platen 6' such that light may pass through the sample 3', along the optical axis 11' of the detector array. The light source 7' is connected to the controller 5' and the intensity of the light output may be controlled by the controller 5'.

Figure 6:
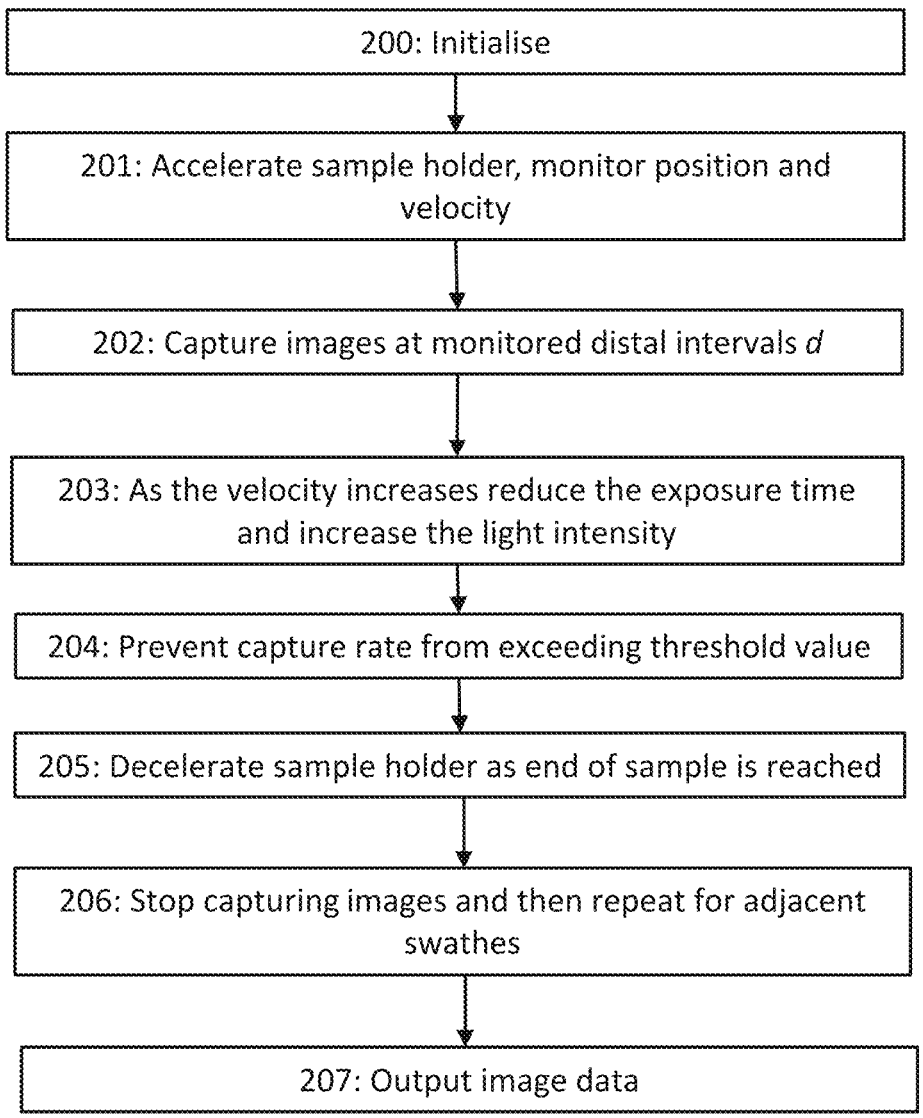
FIG. 6 is a flow diagram illustrating a third example method.

A third example of a method for performing the disclosure will now be discussed with reference to FIG. 6 which illustrates a flow diagram for performing the method and with reference to the apparatus shown in FIG. 5. The start-up initialisation procedures are performed at step 200 which includes positioning the scan head 2' so that it is aligned with the edge of the scan area for the sample 3'. At step 201 the controller 5' issues a signal to the servomotor causing the scan head 2' to be accelerated in the x-direction on the track 8' along a scan path according to a target velocity profile. The encoder monitors the position of the scan head 2' and feeds this information to the controller 5' which calculates the instantaneous velocity of the scan head 2'. At step 202, having determined that a distance d has been moved, the controller 5' issues trigger signals to the detector array causing it to capture images of the target 3' within the scan area. This process continues for subsequent increments of d. As the velocity increases, the controller 5' sends a signal to the detector array causing the exposure time of each image to be shortened. This is done to reduce image blur. Simultaneously to this, the controller 5' also increases the intensity of the light output by the light source 7' accordingly so that the overall light exposure on the detector array is the same for each image.

The sample holder 6 is continuously moved during the scan and images are obtained by the line scan detector 2 whilst the sample 3 is in motion. For a suitable choice of array detector it is not necessary to stop the movement of the sample 3 so that an image can be captured.

The maximum capture rate of the system may be compromised to allow for the minimum time interval between successive image capture triggers during a scan. If images are triggered at a rate higher than the maximum frame rate (also known as the maximum line rate) of the detector array, the trigger may be ignored leading to a missing image (i.e. frame or line) in the aggregate image. The controller 5' is therefore further provided with a filter module such that the trigger rate does not exceed the maximum frame rate during the scan. The trigger rate can be set so as to not exceed a notional minimum time interval chosen to include the response time of the detector array, which is determined by the maximum frame rate, and to make an allowance for the impact of any possible minor accelerating vibrations.

As the velocity and frame rate of the detector increases the filter module on the controller activates at step 204 and prevents the capture rate from exceeding the notional minimum time interval set for the system 1'. The target velocity for the stepper motor may also fall constant at this point so as to not create spatial distortions in the image. At step 205 the scan head 2' is decelerated as the end of the scan area for the sample 3' is reached and the brightness of the light is adjusted accordingly. Once the sample has been imaged in the x-direction image capture ceases, the detector array is moved back to the initialisation position and laterally offset in the y-direction at step 206. Steps 201 to 205 are then repeated to obtain additional adjacent image swathes until the sample 3' has been fully imaged.

At step 207 each image or "image tile" obtained at the plurality of target positions during the imaging scan is combined together so as to form an aggregate image of the sample. Any missing images or lines in the image may be ignored or corrected for using interpolation, an example of which is cubic interpolation with sample points being taken from the four nearest neighbours. A discussion and comparison of various interpolation techniques that are utilised with a contouring and 3D surface mapping program known as Surfer™, is provided in Yang, Kao, Lee and Hung, *Twelve Different Interpolation Methods: A Case Study of Surfer* 8.0 *Proceedings of the XXth ISPRS Congress,* 2004, 778-785. Most of these techniques can be simplified for this application as the data is only irregularly spaced in one axis (along the image scan path). In addition to this, the spacing can be assumed to be regular over a small number of images. The aggregated image of the sample may then be analysed.

In the present disclosure, the verb "may" is used to designate optionality/noncompulsoriness. In other words, something that "may" can, but need not. In the present disclosure, the verb "comprise" may be understood in the sense of including. Accordingly, the verb "comprise" does not exclude the presence of other elements/actions. In the present disclosure, relational terms such as "first," "second," "top," "bottom" and the like may be used solely to distinguish one entity or action from another entity or action without necessarily requiring or implying any actual such relationship or order between such entities or actions.

In the present disclosure, the term "any" may be understood as designating any number of the respective elements, e.g. as designating one, at least one, at least two, each or all of the respective elements. Similarly, the term "any" may be understood as designating any collection(s) of the respective elements, e.g. as designating one or more collections of the respective elements, a collection comprising one, at least one, at least two, each or all of the respective elements. The respective collections need not comprise the same number of elements.

In the present disclosure, the expression "at least one" is used to designate any (integer) number or range of (integer) numbers (that is technically reasonable in the given context). As such, the expression "at least one" may, inter alia, be understood as one, two, three, four, five, ten, fifteen, twenty or one hundred. Similarly, the expression "at least one" may, inter alia, be understood as "one or more," "two or more" or "five or more."

In the present disclosure, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

In the present disclosure, many features are described as being optional, e.g. through the use of the verb "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Further, in describing representative embodiments of the subject disclosure, the specification may have presented the method and/or process of the present disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

The invention claimed is:

1. A method for imaging a sample comprising:
moving a sample holder along a scan path according to a target velocity profile, wherein the movement of the sample holder is relative to a detector array;
(ii) monitoring a position of the sample holder along the scan path;
(iii) deriving an instantaneous velocity of the sample holder based on the target velocity profile;
(iv) determining an exposure time for image capture based on the derived instantaneous velocity; and
(v) capturing a first image of a sample positioned within the sample holder with the detector array after the sample holder has moved a first threshold distance along the scan path, and wherein the image is captured for the determined exposure time.

2. The method of claim 1, wherein the position is monitored using a linear incremental encoder or a rotary encoder.

3. The method of claim 1, wherein a second image is captured after the sample holder has moved a second threshold distance along the scan path, wherein the first and second threshold distances are the same.

4. The method of claim 1, further comprising modulating an intensity of light from a light source based on the determined exposure time.

5. The method of claim 1, wherein the first image is captured while the sample holder is accelerating.

6. The method of claim 1, wherein the first threshold distance is about equal to the field of view of the detector.

7. The method of claim 1, wherein the sample is moved using a stepper motor.

8. The method of claim 1, wherein the sample is moved using a servomotor.

9. A method for imaging a sample comprising:
(a) moving a sample holder along a scan path according to a target velocity profile;
(b) monitoring a position of the sample holder with a position sensor along the scan path; and
(c) capturing an image of a sample within the sample holder each time the sample holder moves a predetermined distance along the scan path, wherein the predetermined distance alone the scan path is the same for each image capture, and wherein each image is independently captured for an exposure time based on a computed instantaneous velocity of the sample holder as it is continuously moved along the scan path.

10. The method of claim 9, further comprising increasing an intensity of light output from a light source based on the exposure time for each image capture.

11. The method of claim 9, wherein the instantaneous velocity is computed based on the target velocity profile.

12. The method of claim 9, wherein the instantaneous velocity is computed by calculating a change in the monitored position of the sample holder over time.

13. The method of claim 9, wherein the sample is moved using a stepper motor.

14. The method of claim 9, wherein the sample is moved using a servomotor.

15. The method of claim 9, wherein the position is monitored using a linear incremental encoder.

16. A method for imaging a sample comprising:
(a) moving a sample holder along a scan path according to a predetermined target velocity profile; and
(b) capturing a plurality of images of a sample positioned within the sample holder while the sample is in motion; wherein each image of the plurality of images is captured after the sample holder has moved a predetermined distance along the scan path, wherein the predetermined distance of each image capture is approximately equal; and wherein each image of the plurality of images is independently captured for an exposure time derived from an instantaneous velocity calculated while the sample is moving along the scan path.

17. The method of claim 16, further comprising modulating an intensity of light from a light source for each image capture based on the exposure time.

18. The method of claim 16, wherein the detector array is a line scan camera, and wherein each image of the plurality of images is captured at a rate which is less than a maximum line rate of the line scan camera.

19. The method of claim 16, further comprising combining each image of the plurality of images into an aggregate image.

20. The method of claim 19, further comprising interpolating missing data in the aggregate image.

* * * * *